United States Patent [19]
Pendalwar

[11] Patent Number: 6,048,638
[45] Date of Patent: Apr. 11, 2000

[54] FLEXIBLE BATTERY

[75] Inventor: Shekhar L. Pendalwar, Lawrenceville, Ga.

[73] Assignee: Motorola, Inc., Schaumburg, Ill.

[21] Appl. No.: 09/086,666

[22] Filed: May 29, 1998

[51] Int. Cl.$^7$ .................................................. H01M 2/02
[52] U.S. Cl. ...................... 429/127; 29/623.1; 29/623.2
[58] Field of Search ................................. 429/127, 124, 429/162, 163, 99, 100, 176; 29/623.1, 623.2

[56] References Cited

U.S. PATENT DOCUMENTS 5,895,731   5/1997   Clingempeel ........................... 429/162
5,916,704  10/1997   Lewin et al. ........................ 429/127 X

*Primary Examiner*—Maria Nuzzolillo
*Assistant Examiner*—Susy Tsang
*Attorney, Agent, or Firm*—Felipe J. Farley; Philip H. Burrus, IV

[57] ABSTRACT

Described is battery comprising a flexible pouch with two compartments wherein an electrochemical device is in the first compartment and the second compartment is empty. Channels for the conduction of gas connect the first and second compartments. When gases are formed during the initial charge and discharge cycles of the electrochemical device, the compartment containing the electrochemical device can be pressed on, driving the gas into the second, empty, compartment. The area between the two compartments can be sealed, and the second compartment cut off. This provides an easy, economical way of ridding an electrochemical device, such as a lithium-ion polymer cell of excess gases formed during the initial charge and discharge cycles.

7 Claims, 1 Drawing Sheet

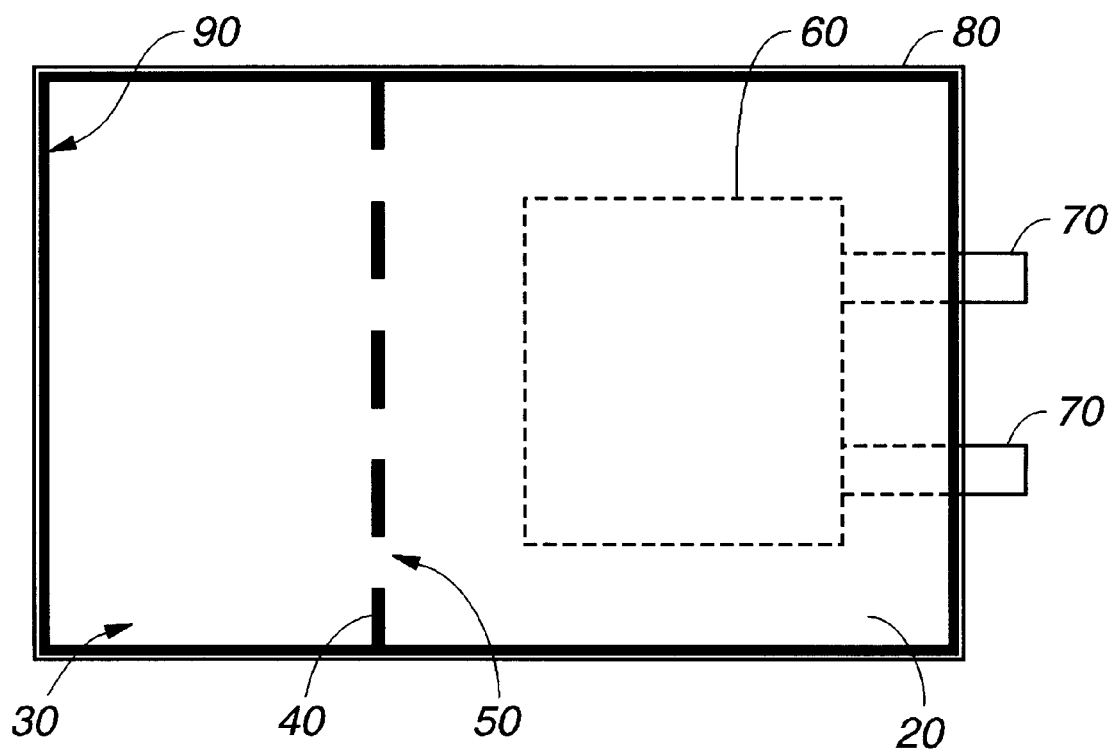

FLEXIBLE BATTERY

TECHNICAL FIELD

This invention relates in general to the field of battery cells, and more particularly in the field of flexible housings for battery cells.

BACKGROUND OF THE INVENTION

Rechargeable lithium batteries operating at room temperature offer several advantages compared to conventional aqueous technologies. These advantages include higher energy density, (up to 150 watt-hrs per kilogram), higher cell voltage (up to about 4V per cell), and longer charge retention or shelf life (up to 5–10 years). These advantageous characteristics result in part from the high standard potential and low electrochemical equivalent weight of lithium. A variety of materials have been investigated for the use as electrodes, such as intercalation solid compounds, soluble and polymeric materials. Liquid aprotic organic solvents containing dissolved inorganic salts are used as electrolytes in many cells. Solid polymer electrolytes are also popular as they may provide a safer design because of their lower reactivity with lithium.

Rechargeable lithium batteries have been introduced into the market on a limited scale. Coin cells using lithium-aluminum anodes are available for special applications mainly for low-power portable applications where they can be conveniently recharged, and in some instances by solar cells. More recently, the lithium ion cell, which has a potential safety advantage over other lithium secondary cells as it does not contain lithium in a metallic form has been marketed as a power source for consumer electronics such as cellular telephones and camcorders.

The rechargeable lithium ion polymer cells, which use solid polymer electrolytes, are considered to have a safety advantage over the lithium ion cells because of their lower reactivity with lithium, and in having low concentration of volatile and often flammable organic solvents. In their most common form, these cells use a lithium-ion conducting polymer membrane which acts both as the electrolyte and as the separator, a thin-lithium metal foil or carbon based material as the negative or anode material, and a transition metal oxide or chalcogenide such as $V_2O_5$, $TiS_2$ or $V_6O_{13}$ blended with carbon and backed by metal foil current collector as a positive electrode.

Polymer electrolyte battery cells are often packaged in a flexible container consisting of metallized foil and several layers of a special polymer. Gas formation due to electrolyte decomposition during initial cycling is very common in polymer cells. Getting rid of these gases is very tedious. Therefore there is a need for an improved flexible metal foil packaging for a polymer battery cell that would make this tedious and time consuming operation easy.

BRIEF DESCRIPTION OF THE DRAWINGS

FIG. 1 is a schematic view of the flexible battery of the present invention.

DETAILED DESCRIPTION OF THE PREFERRED EMBODIMENT

The present invention is a flexible battery, for example, a lithium-ion polymer cell, comprising a pouch with two compartments where the electrochemical device is in the first compartment, and the second compartment is empty. Partial sealing between these two compartments provides one or more channels that permit the free flow of gases between the first and second compartments. When gases are generated during the first few charge and discharge cycles of the electrochemical device, gases can be physically pressed out of the first compartment into the second compartment, the space between the two compartments can be sealed, and the second compartment can be cut off. This provides a simple way of removing excess gasses from the electrochemical device manufactured in a flexible pouch without ever exposing it to the external environment.

The device of the present invention is shown in FIG. 1. The device (10) of the present invention comprises a pouch (80) divided into two compartments: first compartment (20), and second compartment (30). Pouch (80) is typically a flexible metallized foil laminate. It is usually made up of multiple layers comprising a heat resistant outer polymeric layer, e.g. polyethylene terephthalate, a thin metallic foil layer (e.g. aluminum) with good oxygen and moisture barrier properties, a supporting polymeric layer such as polyethylene terephthalate, polyethylene, etc., and a heat sealable inner layer of polymeric material. Additional polymeric material can be used in between to hold all the layers together. In the initial manufacturing stages of the invention, an electrochemical device (60) is placed in first compartment (20). Pouch (80) is then sealed all along the perimeter, as shown by seal (90) and partially sealed between the two compartments as shown by areas (40). Tabs (70) protrude from the interior to the exterior of the battery. Channels (50) going through sealed area (40) between compartments (20) and (30) permit the free flow of gases from compartment (20) to empty compartment (30). Electrochemical device (60), which may be a lithium-ion polymer cell, may then be charged and discharged several times in normal formation cycling. This cycling produces gasses, which must somehow be expelled from the device. In a prior art lithium polymer cell encased in a flexible pouch, the pouch itself would have to be cut, which could expose volatile internal cell components to the outer atmosphere. This could be quite a messy operation and electrolyte loss due to evaporation would result, leading ultimately to poor performance. In the present invention, however, first compartment (20) is simply pressed down, causing gases to go through channel (50) into empty compartment (30). Then, channels (50) are sealed to isolate compartment (30) from the compartment (20) completely. Alternatively, a seal line may be placed anywhere which isolates the excess gases from the first compartment (20). Therefore, the excess gases are now trapped in compartment (30). This compartment may now be cut off of device (10) along seal-line (40). This provides a simple and effective way of ridding a cell of excess gases produced during the initial charging and discharging cycles.

In another embodiment of the method of the present invention, second compartment (30) can be cut to allow for entry of a vacuum inlet port, to suck out the excess gas in battery cell (10). Pouch (80) is then sealed as explained above. Since second compartment (30) is not exposed to the outside atmosphere, this inhibits loss of electrolyte from first compartment (20).

In one embodiment of the invention, electrochemical device (60) is a lithium-polymer cell. Compartment (30) can be made long enough to accommodate all the gas expelled. The length and design of compartment (30) and (20) can be determined by one of ordinary skill in the art after reading the foregoing specification.

Though the present invention has been described in terms of a battery, it also comprises other electrochemical devices in flexible housings which require elimination of excess gases, such as capacitors.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery comprising:

a flexible pouch with two compartments, wherein an electrochemical device is in the first compartment and the second compartment is empty, and channels permit the free flow of gases between the first and second compartments.

2. The battery of claim 1, wherein the pouch is comprised of metallized foil.

3. The electrochemical device of claim 1, wherein the battery device is a lithium-ion polymer battery.

4. A method of making a battery comprising the steps of:

placing an electrochemical device in the first compartment of a two-compartment flexible pouch, where channels for the conduction of gases connect the compartments;

(b) sealing the outer edges of the pouch;

(c) charging and discharging the electrochemical device one or more times to produce gases;

(d) pressing on the first compartment so that any gases formed are driven into the second compartment;

(f) sealing the connecting channels or alternatively sealing to isolate the compartment containing the device from the one containing gases;

(g) cutting off the second compartment while keeping the channels sealed.

5. A capacitor comprising:

a flexible pouch with two compartments, wherein an electrochemical device is in the first compartment and the second compartment and the second compartment is empty, and channels permit the free flow of gases between the first and second compartments.

6. The capacitor of claim 1, wherein the pouch is comprised of metalized foil.

7. A method of making a capacitor comprising the steps of:

placing an electrochemical device in the first compartment of a two- compartment flexible pouch, where channels for the conduction of gases connect the compartments;

(b) sealing the outer edgesof the pouch;

(c) charging and discharging the electrochemical device one or more times to produce gases;

(d) pressing on the first compartment so taht any gases formed is are driven into the second compartment;

(f) sealing the connecting channels or alternatively sealing to isolate the compartment containing the device from the one containing gases;

(g) cutting off the second compartment while keeping the channels sealed.

* * * * *